United States Patent

Hara et al.

[11] Patent Number: 5,691,527
[45] Date of Patent: Nov. 25, 1997

[54] TWO DIMENSIONAL CODE READING APPARATUS

[75] Inventors: Masahiro Hara; Motoaki Watabe, both of Kariya, Japan

[73] Assignee: Nippondenso Co., Ltd., Kariya, Japan

[21] Appl. No.: 579,608

[22] Filed: Dec. 26, 1995

[30] Foreign Application Priority Data

Dec. 26, 1994 [JP] Japan .................. 6-322873

[51] Int. Cl.$^6$ .................................................. G06K 7/10
[52] U.S. Cl. .................................. 235/456; 235/494
[58] Field of Search ........................ 235/454, 456, 235/462, 494

[56] References Cited

U.S. PATENT DOCUMENTS

| | | |
|---|---|---|
| 3,074,634 | 1/1963 | Gamo . |
| 3,801,775 | 4/1974 | Acker ............................ 235/462 |
| 4,736,109 | 4/1988 | Dvorzsak ........................ 250/566 |
| 4,760,247 | 7/1988 | Keane et al. ................... 235/454 |
| 4,924,078 | 5/1990 | Santanselmo et al. . |
| 5,053,609 | 10/1991 | Priddy et al. . |
| 5,103,489 | 4/1992 | Miette ............................ 382/101 |
| 5,288,986 | 2/1994 | Pine et al. ...................... 235/494 |
| 5,291,564 | 3/1994 | Shah et al. ..................... 382/291 |
| 5,308,960 | 5/1994 | Smith et al. ................... 235/454 |
| 5,343,031 | 8/1994 | Yoshida .......................... 235/494 |
| 5,410,620 | 4/1995 | Yoshida .......................... 235/494 |
| 5,515,447 | 5/1996 | Zheng et al. ................... 235/454 |
| 5,541,396 | 7/1996 | Rentsch .......................... 235/454 |

FOREIGN PATENT DOCUMENTS

| | | | |
|---|---|---|---|
| 0578433 | 1/1994 | European Pat. Off. | .............. 235/494 |
| 61-72371 | 4/1986 | Japan . | |

*Primary Examiner*—Donald T. Hajec
*Assistant Examiner*—Mark Tremblay
*Attorney, Agent, or Firm*—Cushman, Darby & Cushman IP Group of Pillsbury Madison & Sutro LLP

[57] ABSTRACT

A two-dimensional code reading apparatus including a CCD sensor that captures an image including a two-dimensional code attached on an article being conveyed, for example. The two-dimensional code is formed as a matrix of light and dark cells, and includes at least two orientation symbols at corners of the matrix. Each of the orientation symbols is geometrically defined so that when a scanning line signal of the CCD sensor is binary-coded into a sequence of scanning line pulse signals, they show a given frequency component ratio. The two-dimensional code reading apparatus identifies an orientation of the orientation symbols based on positions of the pulse signals showing the given frequency component ratio in the captured image to determine positions of data cells in a data field of the two-dimensional code adjacent to the orientation symbols for decoding code information indicated by the data cells.

20 Claims, 9 Drawing Sheets

FIG. (5b)

FIG. 13
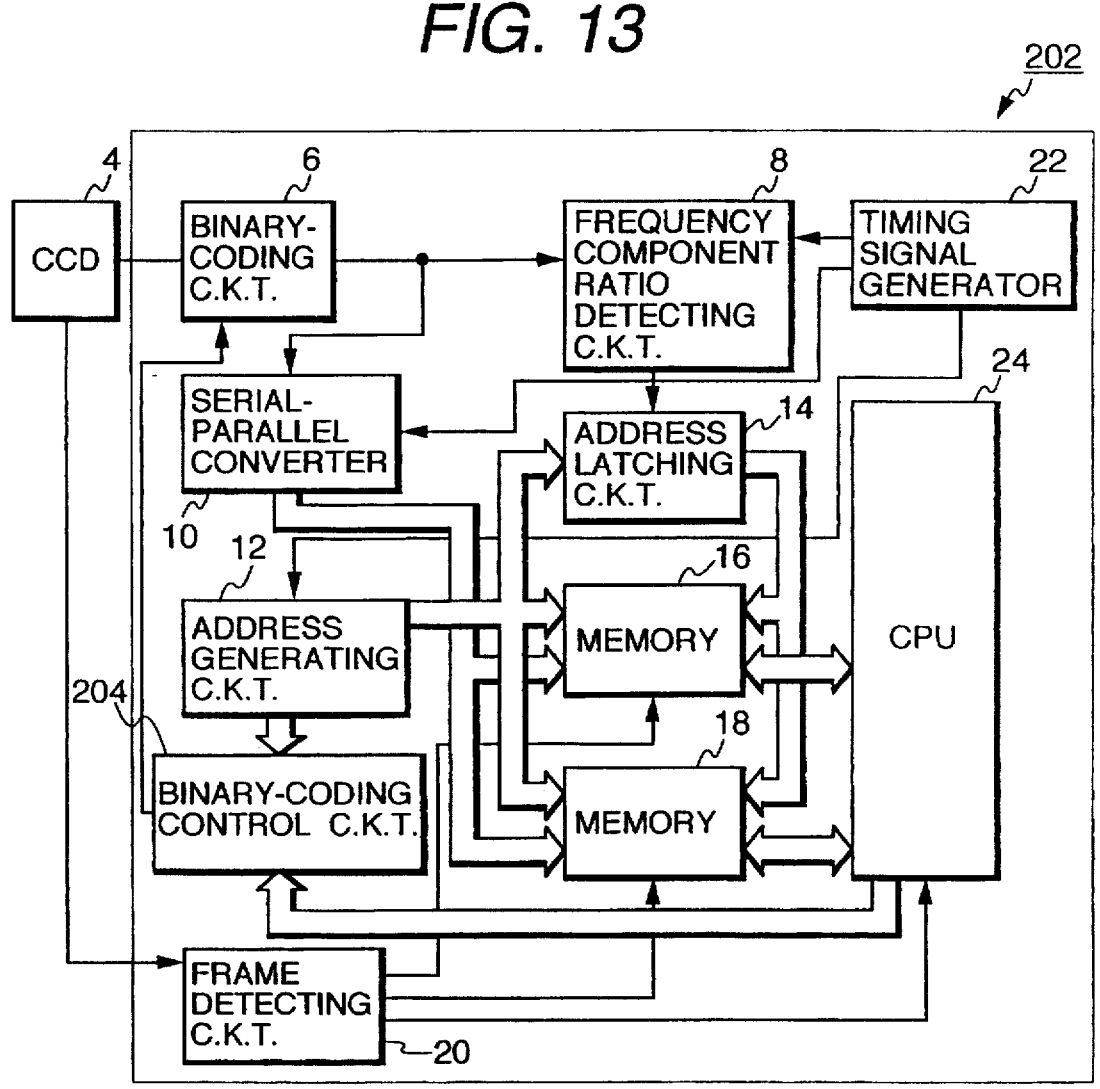
FIG. 14(a)   FIG. 14(b)   FIG. 14(c)
  

TWO DIMENSIONAL CODE READING APPARATUS

BACKGROUND OF THE INVENTION

1. Technical Field

The present invention relates generally to an improvement on a two-dimensional code reading apparatus which is designed to optically read a two-dimensional code formed as a matrix of data cells carrying binary-coded information to be inputted into a computer, for example.

2. Background Art

In general, a two-dimensional code is read by capturing an image thereof through a two-dimensional image capture device such as a TV camera to find the position of the two-dimensional code, and picking it out of the captured image. Next, character information of the two-dimensional code is derived by determining the size of the two-dimensional code, coordinates of each data cell, and a binary number (i.e., white or black) expressed by each data cell. Usually, such a two-dimensional code is capable of carrying a large amount of information in a narrow area as compared with a bar code.

Conventional two-dimensional codes are so designed as to be readable with high accuracy by known coding techniques using error-detecting and -correcting codes. The reading of the two-dimensional codes, however, depends on software using a sophisticated CPU, as will be discussed below, and has a high-speed reading problem. This is because the two-dimensional codes do not have a structure suitable for high-speed reading as well as for processing rotation of the two-dimensional codes.

U.S. Pat. No. 5,053,609 to Priddy et al. teaches a machine readable binary code formed as a matrix having two intersecting sides consisting only of dark cells and other two sides consisting of dark and light cells arranged in an alternating sequence for determining orientation of the matrix. It is, however, necessary to scan the matrix many times in different directions until features of all the sides of the matrix are known for determining a position and a rotational angle of the matrix.

U.S. Pat. No. 4,924,078 to Sant'Anselmo et al. discloses a matrix of data cells having a border of orientation extending in two directions. This border is similar to that disclosed in Priddy et al., and thus, it is necessary to scan the matrix in different directions until the feature of the border is known completely for determining a position and a rotational angle of the matrix.

The size of an image of the matrix is not always constant. Thus, if the position of each data cell is determined based on a predetermined cell-to-cell interval, it will cause a positional error. Additionally, when consecutive dark or light data cells are arranged, a positional error is also incurred depending upon types of reading of the data cells. In Priddy et al., since the light and dark cells are arranged in the form of a broken line on two sides of the matrix, positions of all the data cells can be determined based on positions of the dark and light cells on the two sides of the matrix only by determining orientation of the two sides. In Sant'Anselmo et al., since sequences of the dark cells are arranged along two or more sides of the matrix, positions of all the data cells can be determined based on positions of the dark cells on the two or more sides of the matrix only by determining orientation of the two or more sides.

However, the use of a large number of the data cells for determining the position of each of the data cells results in a decrease in the amount of information represented by the whole of the matrix. Further, the same pattern as that of the four sides of the matrix may be arranged in a data field, and it may also appear according to types of reading of the data cells. This requires a complex cell-reading process, increasing the time required for the cell-reading process.

Usually, a two-dimensional code has a large amount of data to be processed as compared with a bar code, requiring a long period of time for decoding the data. In addition, time is also required to pick up the two-dimensional code out of a captured image because of the above mentioned problems. Further, since the two-dimensional code is usually inputted to a code reader at an unfixed angular position, additional processes are required for detecting the angular position and coordinate transformation prior to decoding, thereby increasing a total time required for processing the two-dimensional code.

SUMMARY OF THE INVENTION

It is therefore a principal object of the present invention to avoid the disadvantages of the prior art.

It is another object of the present invention to provide a two-dimensional code reading apparatus which is capable of reading a two-dimensional code from every direction at high speed with high accuracy.

According to one aspect of the present invention, there is provided a two-dimensional code reading apparatus which comprises a CCD sensor that captures an image including a two-dimensional code by optically scanning the image along scanning lines, the two-dimensional code being formed as a matrix of cells, including orientation symbols each having a given pattern, located at given positions in the matrix, the CCD sensor outputting scanning line signals having signal levels corresponding to the brightness of portions of the captured image on the scanning lines; a binary that codes circuit coding the scanning line signals outputted from the CCD sensor into binary-coded scanning line signals according to the signal levels of the scanning line signals, and outputs the binary-coded scanning line signals; a frequency component ratio detecting circuit that detects a sequence of signals showing a given frequency component ratio corresponding to the given pattern of the orientation symbols from among the binary-coded scanning line signals outputted from the binary-coding circuit, and outputs frequency component ratio signals based on the detected sequence of signals; a memory means for storing the binary-coded scanning line signals as image data at memory locations indicated by addresses each corresponding to coordinates on the image captured by the CCD sensor; an address latching circuit that determines coordinates on the captured image to which the sequence of signals showing the given frequency component ratio detected by the frequency component ratio detecting circuit correspond according to a timing of a signal output of the frequency component ratio detecting circuit, and writes the determined coordinates in the image data stored in the memory means; and a CPU that reads the image data, in which the coordinates of the sequence of signals showing the given frequency component ratio are written by the address latching circuit, from the memory means to determine positions of the orientation symbols in the captured image based on the coordinates of the sequence of signals showing the given frequency component ratio, and reads data represented by the two-dimensional code based on the positions of the orientation symbols.

In the preferred mode of the invention, the frequency component ratio detecting circuit further detects a sequence of signals indicating a margin arranged in the two-dimensional code adjacent to the orientation symbols from among the binary-coded scanning line signals.

The frequency component ratio detecting circuit detects a direction of the sequence of the signals indicating the margin relative to the sequence of the signals showing the given frequency component ratio.

A binary-coding threshold value correcting means is further provided for correcting a threshold value used in the binary coding circuit for coding the scanning line signals from the CCD sensor into the binary-coded scanning line signals according to conditions of the binary-coded scanning line signals.

The conditions of the binary-coded scanning line signals are signal levels of the binary-coded scanning line signals.

An operation prohibiting means is further provided for prohibiting a two-dimensional code reading operation of the two-dimensional code reading apparatus when the frequency component ratio detecting circuit detects no sequence of signals showing the given frequency component ratio.

A two-dimensional code change detecting means is further provided for detecting change of the two-dimensional code as the two-dimensional code is being displaced out of a field of view of the CCD sensor when the frequency component ratio detecting circuit continuously detects the presence of the sequence of signals showing the given frequency component ratio preselected times, and then does not detect the presence of the sequence of signals showing the given frequency component ratio for a predetermined period of time.

The frequency component ratio detecting circuit includes counter means for detecting rising edges and falling edges of the binary-coded scanning line signals outputted from the binary coding circuit to measure lengths between the adjacent edges, and outputting count values indicative of the measured lengths in sequence, a plurality of latching circuits latching the count values outputted from the counter means in sequence, and comparator means for comparing the count values latched in the latching circuits to determine that the sequence of signals showing the given frequency component ratio has been detected when a given sequence of the count values are arranged at a given ratio corresponding to the given frequency component ratio.

Each of the orientation symbols of the two-dimensional code is arranged at a given location in the matrix, and includes similar figures arranged coaxially so as to define a pattern having the sequence of signals selected by the frequency component ratio detecting circuit from among the binary-coded scanning line signals that exhibit the same frequency even when the CCD sensor scans each of the orientation symbols along scanning lines extending in different directions.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 5(b) shows binary-coded scanning line signals derived by scan of the scanning lines shown in FIG. 5(a);

FIG. 13 is a circuit diagram which shows a two-dimensional code reading apparatus according to the second embodiment of the invention; and FIGS. 14(a), 14(b), and 14(c) show modifications of an orientation symbol arranged in a two-dimensional code.

DESCRIPTION OF THE PREFERRED EMBODIMENT

Figure 1:
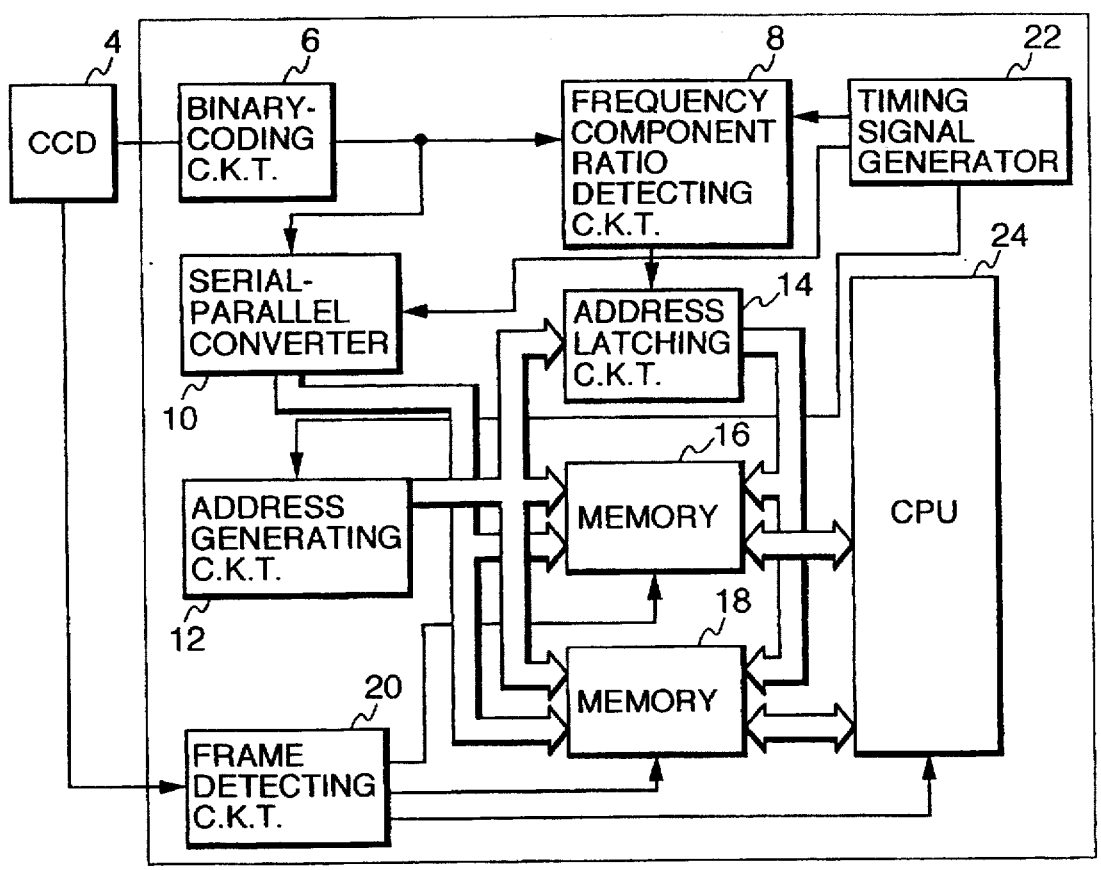
FIG. 1 is a circuit diagram which shows a two-dimensional code reading apparatus according to the present invention.

Referring now to the drawings, particularly to FIG. 1, there is shown a two-dimensional code reading apparatus 2 according to the invention.

The two-dimensional code reading apparatus 2 generally includes an image capture device 4 such as a CCD camera, a binary coding circuit 6, a frequency component ratio detecting circuit 8, a serial-parallel converter 10, an address generating circuit 12, an address latching circuit 14, memories 16 and 18, a frame detecting circuit 20, a timing signal generating circuit 22, and a CPU 24.

The CCD camera 4 includes pixels which capture a two-dimensional image and provide it in the form of horizontal scanning line signals. The binary coding circuit 6 then codes the horizontal scanning line signals into binary numbers or pulse signals based on a threshold value. The frequency component ratio detecting circuit 8 detects a given frequency component ratio from among the binary-coded horizontal scanning line signals using a circuit arrangement, as will be described later. The serial-parallel converter 10 converts the binary-coded horizontal scanning line signals outputted, in series, from the binary coding circuit 6 into parallel signals (e.g., 8-bit signals), and provides them to the memories 16 and 18. The address generating circuit 12 is responsive to clock signals from the timing signal generating circuit 22 to provide address signals, in sequence, to the memories 16 and 18 and the address latching circuit 14 for specifying locations in the memories 16 and 18. The address latching circuit 14 is responsive to a latch signal indicating that the frequency component ratio detecting circuit 8 has detected the given frequency component ratio to latch the address signal outputted from the address generating circuit 12 at that time for writing its address data in the memories 16 and 18.

The frame detecting circuit 20 receives frame switching signals from the CCD camera 4 to control gates of the memories 16 and 18 so that some of the binary-coded scanning line signals corresponding to a frame at an even position may be stored in the memory 16, while the others corresponding to a frame at an odd position may be stored in the memory 18, and so that the address data from the address latching circuit 14 may be stored in the memories 16 and 18 in a similar manner. The timing signal generating circuit 22 provides clock signals for achieving synchronization of the timing of the frequency component ratio detecting circuit 8, the serial-parallel converter 10, and the address generating circuit 12. The CPU 24 is responsive to output signals from the frame detecting circuit 20 to gain access to the memories 16 and 18 alternately for two-dimensional code processing of image data over one captured picture (i.e., one field), as will be discussed later.

Figure 2A:
FIG. 2(a) shows a signal waveform outputted from a CCD camera.
Figure 2B:
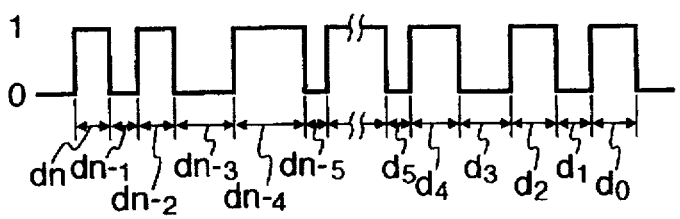
FIG. 2(b) shows a signal waveform outputted from a binary coding circuit.

FIG. 2(a) shows one example of an analog scanning line signal outputted from the CCD camera 4 to the binary coding circuit 6, while FIG. 2(b) shows a sequence of binary-coded scanning line signals (i.e., pulse signals) outputted from the binary coding circuit 6 to the frequency component ratio detecting circuit 8. When a ratio among a preselected number of consecutive widths $d_0$ to $d_n$ of "0" and "1" indicated by the preselected number of the binary-coded horizontal scanning signals is the given frequency component ratio, the frequency component ratio detecting circuit 8 provides the latch signal indicative thereof to the address latching circuit 14.

Figure 3:
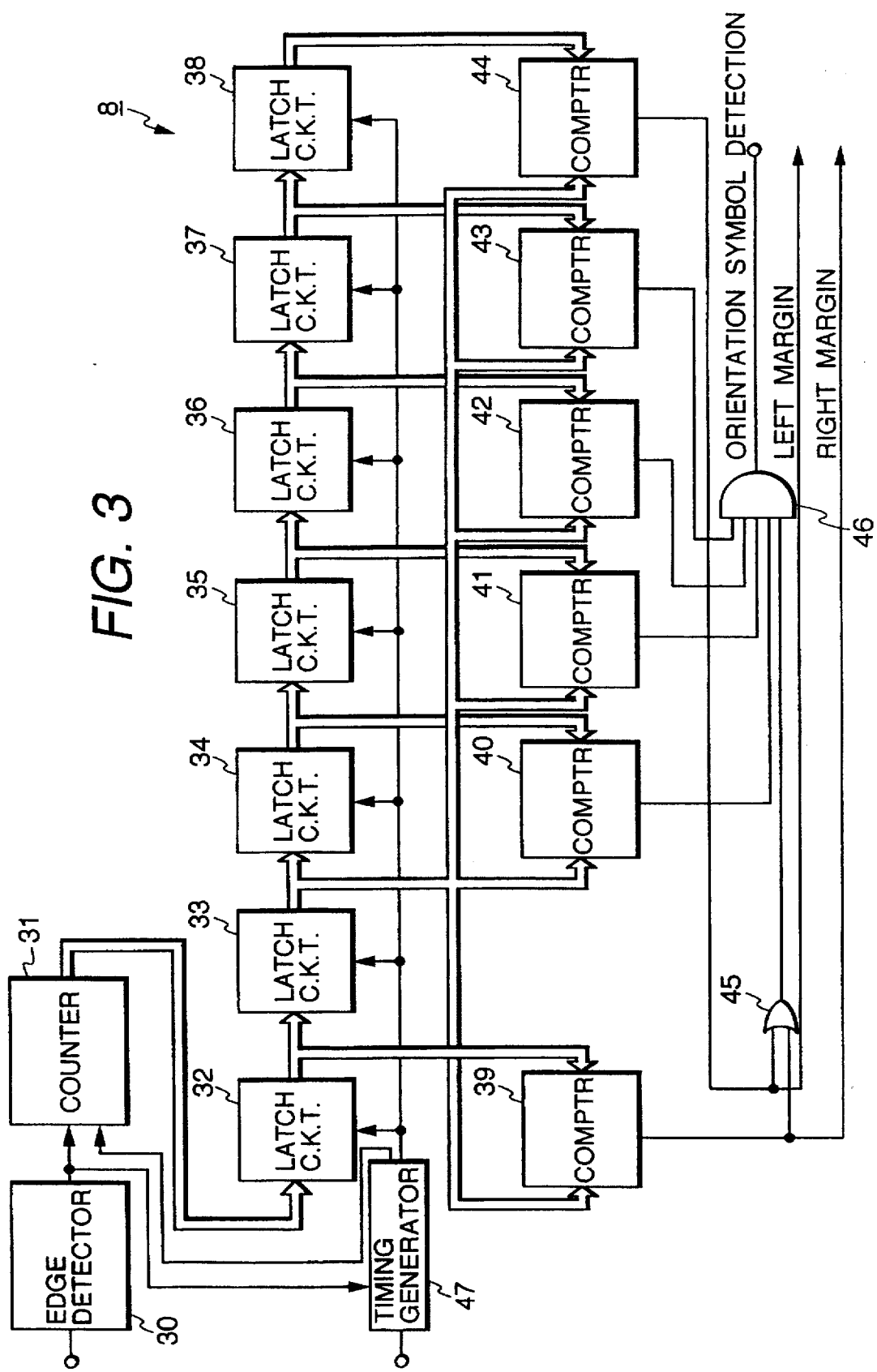
FIG. 3 is a circuit diagram which shows a frequency component ratio detecting circuit.

FIG. 3 shows a circuit arrangement of the frequency component ratio detecting circuit 8 which includes an edge detecting circuit 30, a counter 31, latching circuits 32, 33, 34, 35, 36, 37, and 38, comparators 39, 40, 41, 42, 43, and 44, an OR circuit 45, an AND circuit 46, and a timing signal generator 47.

The edge detecting circuit 30 detects rising and falling edges of the binary-coded scanning line signals, as shown in FIG. 2(b), outputted from the binary coding circuit 6 to provide edge detection signals to the counter 31. Each time the edge detection signal is inputted to the counter 31, the counter 31 outputs a count signal indicative of a count value at that time to the latching circuit 32, and then is cleared to start counting again.

The latching circuit 32 outputs a count signal latched so far to the adjacent latching circuit 33 each time it receives the count signal from the counter 31. Similarly, each of the other latching circuits 33 to 37 transfers the count signal to the adjacent one. In addition, the latching circuits 32 to 37 simultaneously output the count signals to the comparators 39 to 43, respectively. Note that the last latching circuit 38 only outputs its count signal to the comparator 44.

Of the latching circuits 32 to 38, the second latching circuit 33 provides its latched count signal to all the comparators 39 to 44. The other latching circuits 32 and 34 to 38 provide their latched count signals to the comparators 39 to 44, respectively.

Each of the comparators 39 to 44 compares the count signal inputted from the second latching circuit 33 with the count signal inputted from a corresponding one of the latching circuits 32 and 34 to 38. When the count signals outputted from the latching circuits 32 and 34 to 38 indicate a given multiple or a value more than the given multiple of the count signal outputted from the second latching circuit 33, the comparators 39 to 44 provide signals of "1", respectively. Alternatively, when they indicate another multiple of the count signal from the second latching circuit 33, the comparators 39 to 44 provide signals of "0", respectively.

The first comparator 39 provides the signal of "1" when the count signal from the latching circuit 32 indicates a value of two or more times that of the count signal from the latching circuit 33. The second comparator 40 provides the signal of "1" when the count signal from the latching circuit 34 indicates a value of one time that of the count signal from the latching circuit 33. The third comparator 41 provides the signal of "1" when the count signal from the latching circuit 35 indicates a value of three times that of the count signal from the latching circuit 33. The fourth comparator 42 provides the signal of "1" when the count signal from the latching circuit 36 indicates a value of one time that of the count signal from the latching circuit 33. The fifth comparator 43 provides the signal of "1" when the count signal from the latching circuit 37 indicates a value of one time that of the count signal from the latching circuit 33. The sixth comparator 44 provides the signal of "1" when the count signal from the latching circuit 38 indicates a value of two or more times that of the count signal from the latching circuit 33.

Of the comparators 39 to 44, the two comparators 39 and 44 output the signals to the OR circuit 45. The other four comparators 40 to 43 output the signals to the AND circuit 46. The AND circuit 46 also receives an output from the OR circuit 45.

Therefore, when the four comparators 40 to 43 all provide the signals of "1", and when either or both of the comparators 39 and 44 provide the signals of "1", the AND circuit 46 provides a signal of "1". This means that when the count signals outputted from the six latching circuits 32 to 37 on the left side assume a ratio of 2 or more: 1:1:3:1:1, or when the count signals outputted from the six latching circuits 33 to 38 on the right side assume a ratio of 1:1:3:1:1:2 or more, the AND circuit 46 provides the signal of "1", while, in another case, the AND circuit 46 provides a signal of "0".

The above ratio of 1:1:3:1:1 indicates a frequency component ratio meaning that an orientation symbol, as will be described later, has been scanned, and is used as data for specifying a location of the orientation symbol. A number on the rightmost or leftmost side of the ratio of 1:1:3:1:1, namely "2 or more" indicates that a margin on the right or left side of the orientation symbol have been detected, and is used for more accurate detection of the orientation symbol.

The frequency component ratio detecting circuit 8 outputs the signals provided by the comparators 39 and 44 along with the signal from the AND circuit to the address latching circuit 14. These signals are used as data for determining on which of the right and left sides of the orientation symbol a margin is present or whether margins are present on both sides of the orientation symbol or not, and are stored in the memories 16 and 18 along with the address data through the address latching circuit 14.

The timing signal generating circuit 47 achieves synchronization of the timing of the counter 31 and the latching circuits 32 to 38 according to the edge detection signals from the edge detecting circuit 30.

Figure 4:
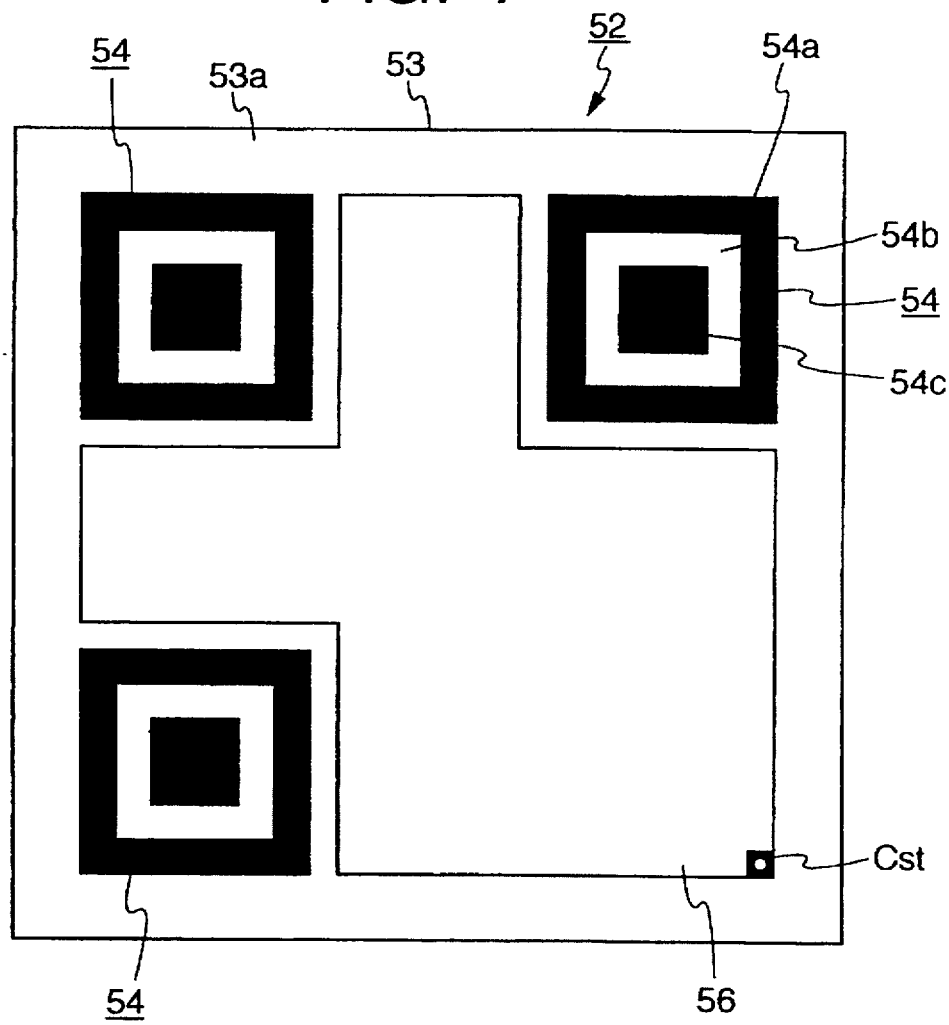
FIG. 4 shows one example of an orientation symbol arranged in a two-dimensional code to be read by a two-dimensional code reading apparatus of the invention.

Referring to FIG. 4, One example of a two-dimensional code read by the two-dimensional code reading apparatus 2.

The two-dimensional code is printed on a white substrate 53 such as paper, and includes three orientation symbols 54, a data field 56, and an origin cell Cst which are arranged in a square matrix of 21×21 cells. Each cell is formed with either of two types of squares that are optically different from each other, for example, dark (i.e., black) and light (i.e., white) squares. FIG. 4 does not show a pattern of data cells in the data field 56 because it is omitted for convenience.

The orientation symbols 54 are, as can be seen in the drawing, arranged on three of four corners of the two-dimensional code 52. Each of the orientation symbols 54 has a pattern including a frame-like hollow square 54a defined by four arrays of the dark cells oriented perpendicular to each other and a smaller square 54b formed of the light cells arranged on the central portion of the hollow square 54a.

Figure 5A:
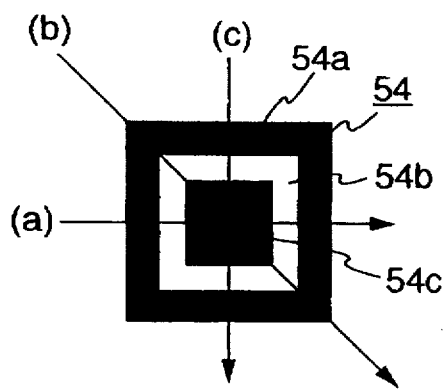
FIG. 5(a) shows scanning lines passing through an orientation symbol.

FIGS. 5(a) and 5(b) show optical detection by scanning the dark and light cells of the orientation symbol 54. Optical signal patterns detected by scanning lines (a), (b), and (c), as shown in FIG. 5(a), passing through the center of the orientation symbol 54 at typical angles assume signal structures having the same frequency component ratio, as shown in FIG. 5(b). Specifically, the frequency component ratio indicated by the optical signal pattern along each of the scanning lines (a), (b), and (c) is dark:light:dark:light:dark= 1:1:3:1:1. Of course, a scanning line passing at an angle intermediate between the scanning lines (a) and (b) or between (b) and (c) also shows the same ratio of 1:1:3:1:1. Additionally, even if the orientation symbol 54 in FIG. 5(a) is arranged on a plane inclined at any angle to a sensor plane of the CCD camera 4, the frequency component ratio indicated by each of the scanning lines is 1:1:3:1:1.

The binary signals (a), (b), and (c) shown in FIG. 5(b) represent the scanning line signals binary-coded by the binary coding circuit 6.

In operation, upon turning on of a power source of the two-dimensional reading apparatus 2, the CPU 24 starts to operate, and at the same time, the other circuits of the two-dimensional reading apparatus 2 also start to operate, respectively. Specifically, image data of every frame is, as mentioned above, stored in the memory 16 or 18 in alternating sequence. Further, if the frequency component ratio of a sequence of the scanning line signals found by the above mentioned processing of the frequency component ratio detecting circuit 8 is 2 or more: 1:1:3:1:1 or 1:1:3:1:1:2 or more, the frequency component ratio detecting circuit 8 provides the latch signal to the address latching circuit 14. The address latching circuit 14 then responds to the latch signal to latch an address outputted from the address generating circuit 1 at that time, and provides it along with a right or left margin signal to the memories 16 and 18 which are writing in the image data.

Figure 7A:
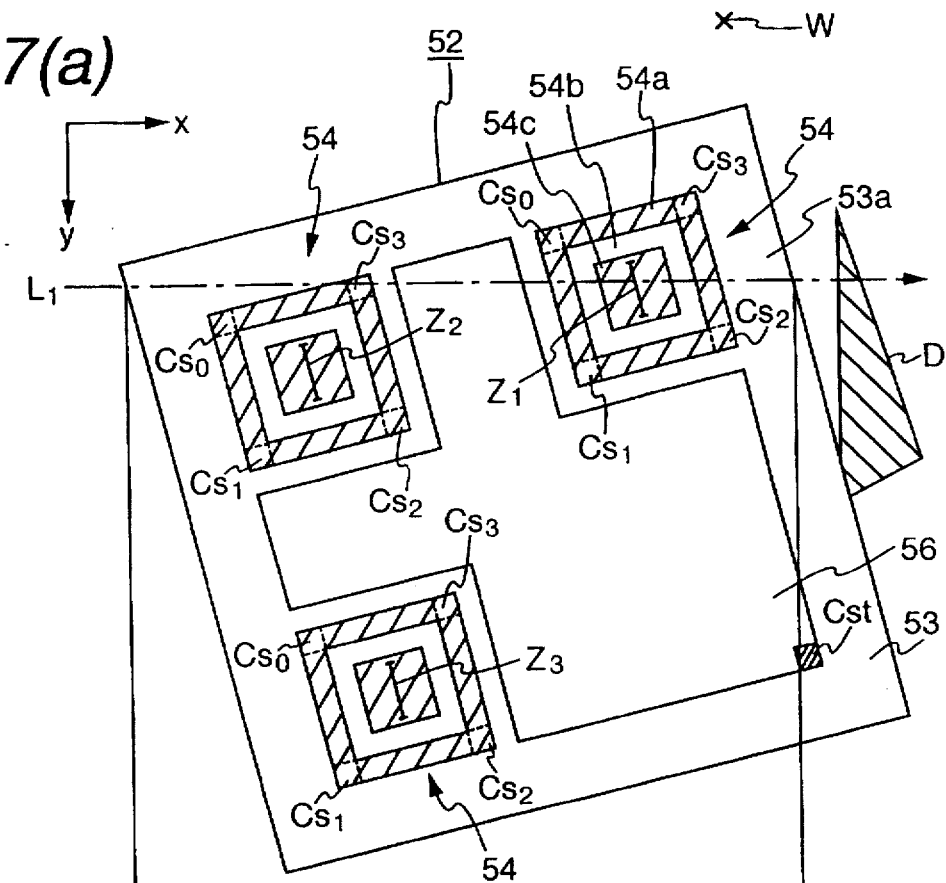
FIG. 7(a) shows a two-dimensional code attached to an article being conveyed at a certain angle to scanning lines of a CCD camera.

In the following discussion, it is assumed that the two-dimensional code 52 is, as shown in FIG. 7(a), printed on an article being conveyed at a certain angle to the conveying direction. FIG. 7(a) omits a code pattern in the data field 56 for the brevity of illustration.

Figure 7B:
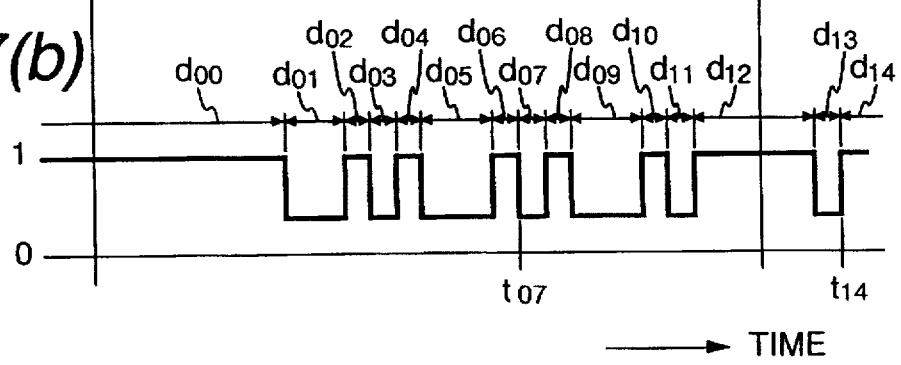
FIG. 7(b) is a time chart which shows a waveform of a binary-coded signal scanned along a scanning line L1.

When the shown two-dimensional code 52 is optically scanned by the CCD camera 4 along the scanning line L1, for example, the binary coding circuit 6 outputs a sequence of binary-coded scanning line signals, as shown in FIG. 7(b). When the six latching circuits 32 to 37 latch count values $d_{05}$, $d_{04}$, $d_{03}$, $d_{02}$, $d_{01}$, and $d_{00}$ and when a falling edge of the binary-coded scanning line signal is detected by the edge detecting circuit 30 at a time $t_{07}$, the counter 31 outputs a count value $d_{06}$ to the latching circuit 32, while the latching circuits 32 to 37 output their latched count values $d_{05}$, $d_{04}$, $d_{03}$, $d_{02}$, $d_{01}$, and $d_{00}$ to the adjacent latching circuits 33 to 38 and to the comparators 39 to 43, respectively. The comparators 39 to 43 then perform arithmetic operations: $d_{05}/d_{04}$, $d_{03}/d_{04}$, $d_{02}/d_{04}$, $d_{01}/d_{04}$, and $d_{00}/d_{04}$. If the results are $d_{05}/d_{04}=2$ or more, $d_{03}/d_{04}=1$, $d_{02}/d_{04}=3$, $d_{01}/d_{04}=1$, and $d_{00}/d_{04}=1$, namely $d_{05}:d_{04}:d_{03}:d_{02}:d_{01}:d_{00}=2$ or more: 1:1:3:1:1, the frequency component ratio detecting circuit 8 provides the latch signal. However, since, in the shown case, $d_{05}:d_{04}:d_{03}:d_{02}:d_{01}:d_{00} \neq 2$ or more: 1:1:3:1:1, the frequency component ratio detecting circuit 8 does not provide the latch signal to the address latching circuit 14, so that the address and the margin signals are not stored in the memories 16 and 18.

Figure 5A:
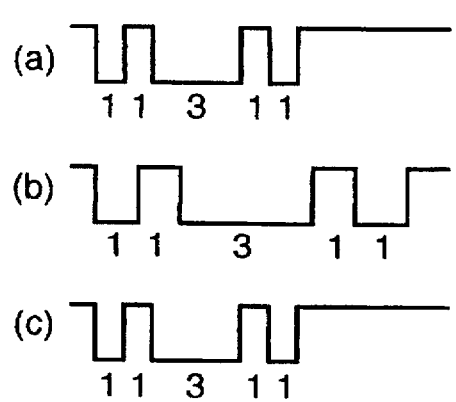

Neither of the frequency component ratios of 2 or more: 1:1:3:1:1 and 2 or more: 1:1:3:1:1 appears before a time $t_{14}$. When the time $t_{14}$ is reached, the counter 31 outputs a count value $d_{13}$ to the latching circuit 32. Simultaneously, the latching circuits 32 to 37 output count values $d_{12}$ to $d_{07}$ to the latching circuits 33 to 38 and comparators 39 to 44, respectively. The latching circuit 38 outputs a count value $d_{06}$ to the comparator 44. The count values $d_{07}$ and $d_{11}$ are provided by the left and right sides of the hollow square 54a consisting of the dark cells of the orientation symbol 54 arranged on the upper right side of the two-dimensional code 52. The count values $d_{08}$ and $d_{10}$ are provided by left and right sides of a square 54b consisting of the light cells. The count value $d_{09}$ is provided by the width of the smaller square 54c consisting of the dark cells along the scanning line L1. The frequency component ratio among these count values $d_{07}$ to $d_{11}$ is, as discussed in FIG. 5, 1:1:3:1:1 according to the configuration of the orientation symbol 54.

The count value $d_{12}$ is provided by a white area ranging from a margin 53a of the substrate 53 to a mark D printed on the article W. Since the shown margin 53a is three times the square 54a in width, $d_{12}/d_{11}$ is more than two (>2). The frequency component ratio of 2 or more: 1:1:3:1:1 is, therefore, derived at the time $t_{14}$. The address latching circuit 14 latches an address outputted from the address generating circuit 12 in response to the latch signal provided from the frequency component detecting circuit 8 at the time $t_{14}$ and outputs it along with a signal indicative of the right margin to either of the memories 16 and 18 which is now writing the image data.

This address corresponds to image coordinates of the two-dimensional image captured by the CCD camera 4, and therefore may be converted into the image coordinates by arithmetic processing, as will be described later. For example, the address stored in the memory 16 or 18 represents an address offset from an address at the time $t_{14}$ by $(d_{13}+d_{12}+d_{11}+d_{10}+(d_{09}/2))$, which corresponds to image coordinates indicating the center of the square 54c along the scanning line L1. When the two-dimensional code 52 is scanned from top to bottom, addresses stored in the memory 16 or 18 indicate central lines Z1 to Z3 of the three orientation symbols 54. When such addresses are stored in the memory 16 or 18, the CPU 24 starts to execute a given program, as will be described later.

Figure 6:
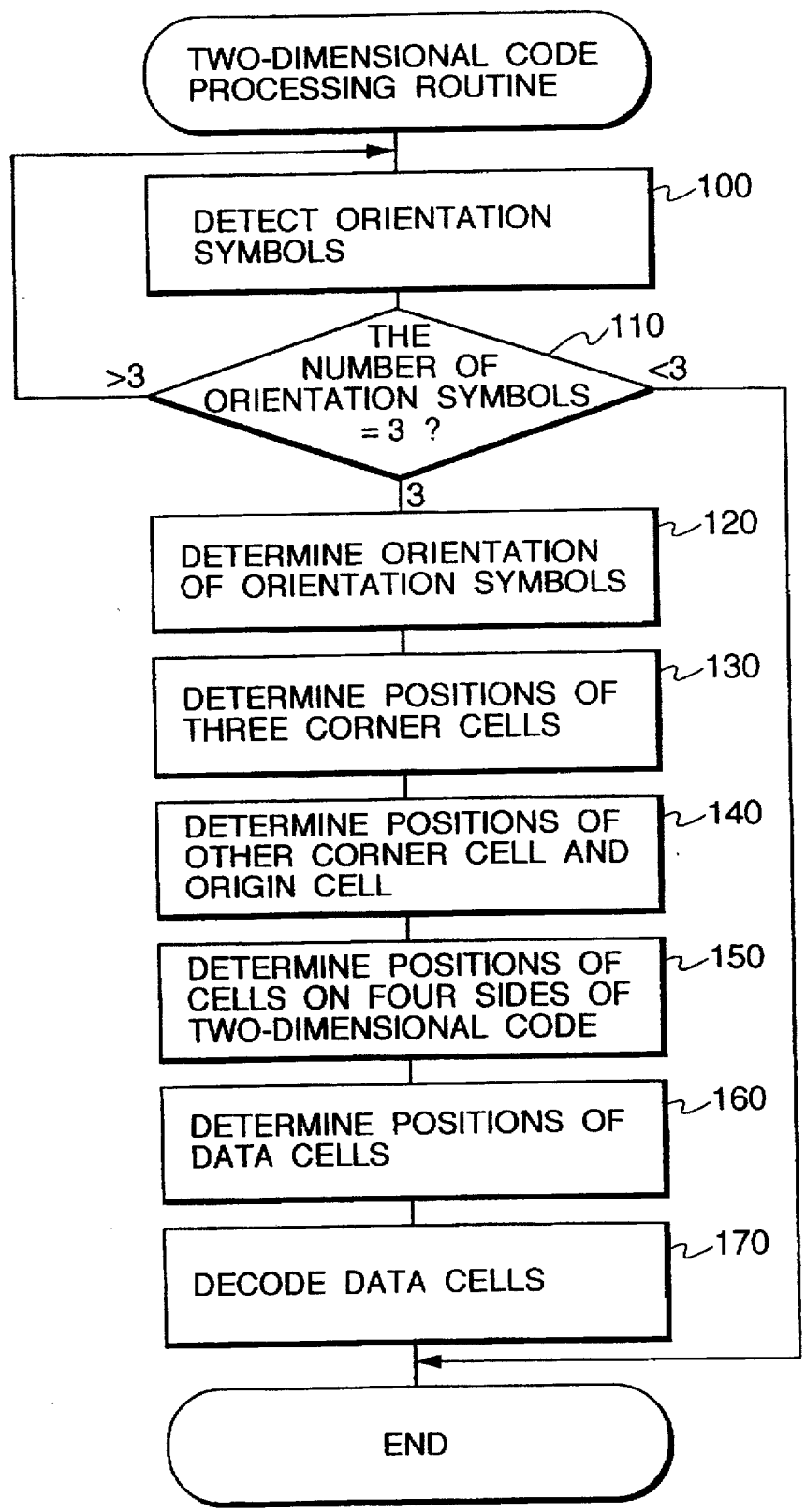
FIG. 6 shows a flowchart of a program or sequence of logical steps performed by a CPU of a two-dimensional code reading apparatus.

The CPU 24 gains access to either of the memories 16 and 18 that has completed data writing for processing image data according to a program shown by a flowchart in FIG. 6.

After entering the program, the routine proceeds to step 100 wherein the orientation symbols 54 are detected. Specifically, address data and margin data contained in captured image data are all read by the address latching circuit 14 to determine the positions of the orientation symbols 54. If there is no address data, then the routine terminates.

The address data read by the latching circuit 14, if not noise, indicate addresses corresponding to the positions of the central lines Z1, Z2, and Z3 shown in FIG. 7(a). A plurality of addresses are produced along the central lines Z1, Z2, and Z3. In step 100, these addresses are classified into several groups. For instance, the addresses are sorted into groups each consisting of X-coordinate values close to each other. Next, each of these groups is further sorted into groups each consisting of Y-coordinate values close to each other. This classifies the addresses into the groups corresponding to the lines Z1, Z2, and Z3, respectively. The position of the center of each of the groups is then determined as indicating the position of a corresponding one of the orientation symbols 54 by, for example, averaging the X- and Y-coordinate values, respectively.

If some of the groups have a much smaller number of addresses than those of the other groups, they may be ignored as being noise.

After step 100, the routine proceeds to step 110 wherein the number of the addresses indicative of the positions of the orientation symbols 54 determined in step 100 is found. If it is three (3) which is the total number of the orientation symbols 54 of the two-dimensional code 52 meaning that the positions of the orientation symbols 54 are determined correctly, then the routine proceeds to step 120. If it is less than three, then the routine terminates. If it is more than three meaning that there is an unuseful address, then the routine returns back to step 100 to determine the positions of the orientation symbols 54 in a different manner. For example, by logically scanning image data of one frame stored in the memory 16 or 18 in vertical directions, portions of scanning lines indicative of the given frequency component ratio are found to determine the central positions thereof. If the number of the portions indicative of the given frequency component is three, then the routine proceeds to step 120. It is desirable that the vertical scan be performed around the orientation symbols the number of which has been determined in step 110 as being greater than three in the pervious program cycle for decreasing the time required for the operation in step 110.

The pattern matching may alternatively be performed in step 110 using a pattern of the orientation symbol 54 at or near the positions of more than three determined in the previous program cycle.

Figure 8:
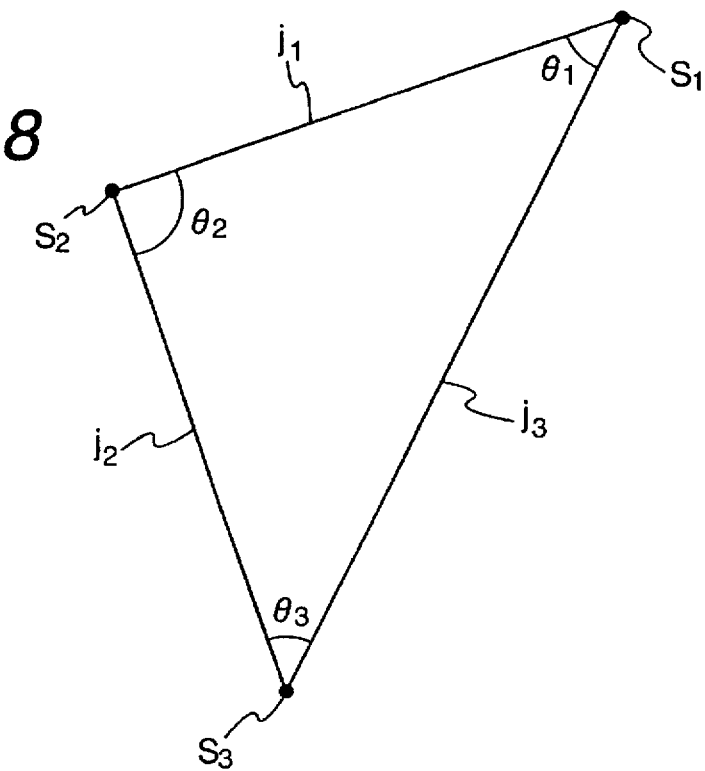
FIGS. 8 and 9 are explanatory views which show processes for determining a positional relation among orientation symbols.

Next, in step 120, it is determined which of the orientation symbols 54 arranged in the two-dimensional code 52 that each of the positions determined in step 100 corresponds to in the following manner. First, the three positions S1, S2, and S3, as shown in FIG. 8, of the orientation symbols 54 derived in step 100 are connected by lines j1, j2, and j3 to determine angles θ1, θ2, and θ3 between adjacent two of the lines j1, j2, and j3. Next, it is determined whether there is an angle of about 90° among θ1, θ2, and θ3 or not. In the example of FIG. 8, θ2 at the position S2 is about 90°. Finally, it is determined whether the lines j1 and j2 are equal in length to each other or not. Since the lines j1 and j2 in FIG. 8 have substantially the same length, it may be recognized that the orientation symbol 54 on the upper right side of the two-dimensional code 52 corresponds to the position S1, the orientation symbol 54 on the upper left side corresponds to the position S2, and the orientation symbols 54 on the lower left side corresponds to the position S3. A slope of the two-dimensional code 52 relative to the scanning line L1 may be determined by finding slopes of the lines j1 and j2 intersecting at the position S2 at 90°.

Figure 9:
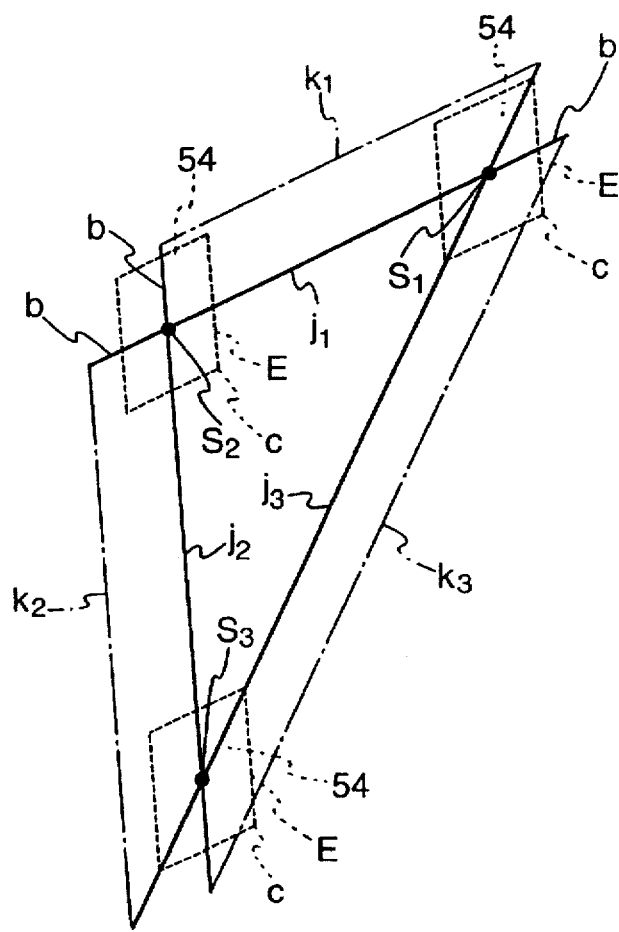

If the two-dimensional code 52 is inclined to the CCD camera 4, it may cause two of the lines j1, j2, and j3 intersecting at about 90° to be different in length from each other, as shown in FIG. 9. In this case, a position at which two of the lines j1, j2, and j3 intersects at an angle closest to 90°, that is, the position S2 is first selected. Next, the lines j1 and j2 intersecting at the position S2 are prolonged outward by a given distance b, respectively, and then phantom lines k1 and k2 are defined from ends of the extended portions of the lines j1 and j2 in parallel to the line j1 and j2, respectively, until they reach extensions of the line j3. Finally, the lines j1 and j2 are also prolonged in the opposite directions by the distance b, respectively, and then a phantom line k3 is defined in parallel to the line j3 between the ends of extended portions of the lines j1 and j2. The distance b is so selected as to be slightly longer than a distance between the center of the orientation symbol 54 and one side E thereof (i.e., half of one side of the orientation symbol 54) and slightly shorter than a distance between the center of the orientation symbol 54 and one corner C thereof. The distance b may be changed according to the lengths of the lines j1 and j2.

A white area having a given width is, as can be seen in FIG. 4, formed on the periphery of the two-dimensional code 52 as the margin 53a. Thus, if it is known that at least one of portions of the two-dimensional code on which the phantom lines k1, k2, and k3 are defined, respectively, consists only of the light cells by scanning these portions, any two of the orientation symbols 54 may be recognized to be inside that portion, as shown in FIG. 9. In other words, the phantom line extending only over the light cells may be recognized to be defined on an upper or side portion of the margin 53a around the orientation symbol 54 on the upper left side of the two-dimensional code 52.

Accordingly, if two phantom lines consist only of the light cells and one phantom line consists only of the dark cells, a positional relation among the three orientation symbols 54 can be found. In the example of FIG. 9, since the phantom lines k1 and k2 both consist only of the light cells and the phantom line k3 consists only of the dark cells, it is found that the position S2 around which the phantom lines k1 and k2 intersect corresponds to the orientation symbol 54 on the upper left side of the two-dimensional code, the position S1 corresponds to the orientation symbol 54 on the upper right side, and the position S3 corresponds to the orientation symbol 54 on the lower left side.

Figure 10:
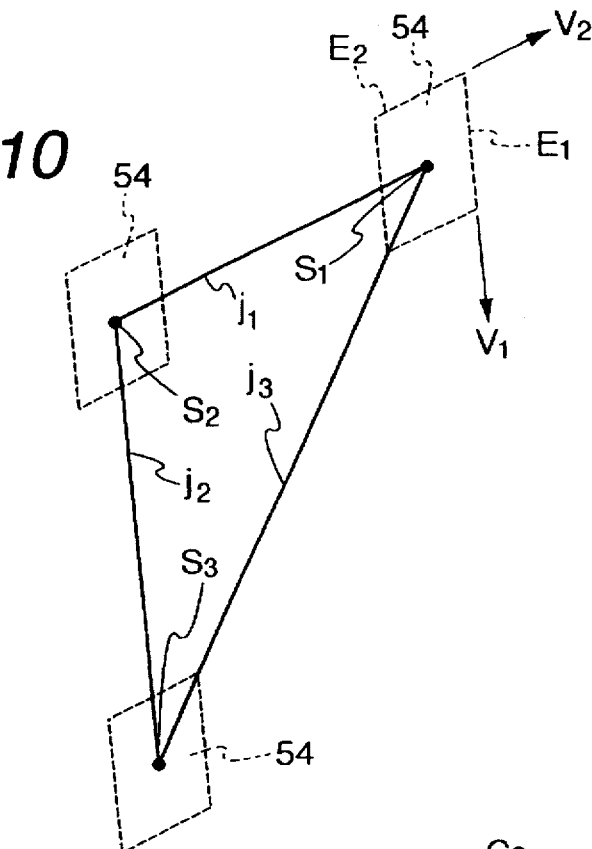
FIG. 10 is an explanatory view which shows another useful process for determining a positional relation among orientation symbols.
Figure 11:
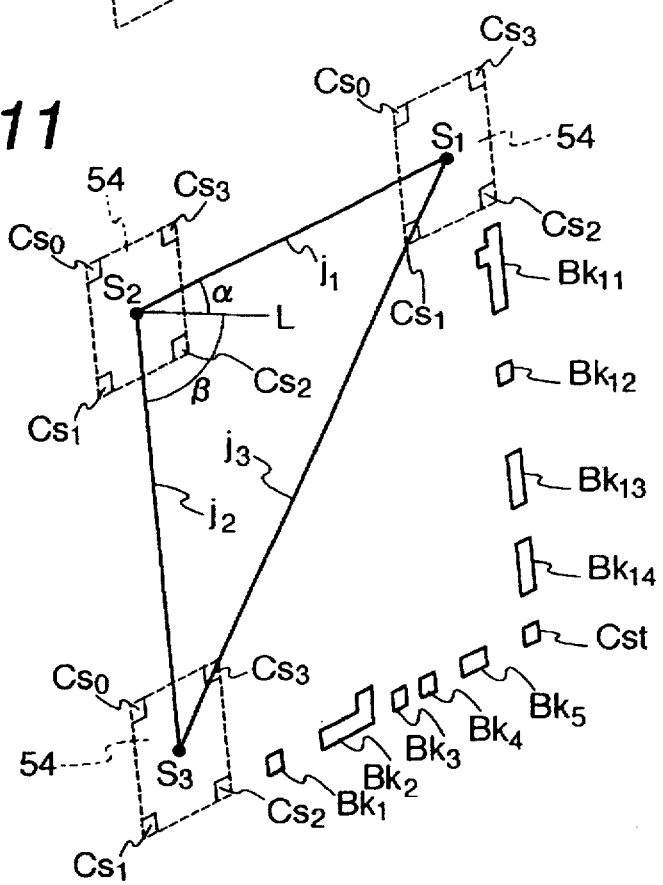
FIG. 11 is an explanatory view which shows a process for determining positions of reference cells.

As an alternative to the above geometrical processing shown in FIG. 9, it is possible to determine the positions of the three orientation symbols 53 in a manner, as shown in FIG. 10. First, directions V1 and V2 of two sides E1 and E2 of the hollow square 54a of the orientation symbol 54 located at any one of the positions S1, S2, and S3 derived in step 100, for example, the position S1, are determined. Next, two lines extending in parallel to the directions V1 and V2 are selected from among the lines j1, J2, and j3. In the example of FIG. 10, the line j1 is in parallel to the direction V1, while the line j1 is in parallel to the direction V2. Since the orientation symbols 54 are all square, and their four sides are always in parallel to the lines j1 and j2 each extending between adjacent two of the orientation symbols 54 arranged on corners of the two-dimensional code 52, the orientation symbols 54 are present on both side corners adjacent the position S2 at which the lines j1 and j2 intersect. Thus, the position S2 may be recognized to correspond to the orientation symbol 54 on the upper left side of the two-dimensional code.

Once the positional relations among the three orientation symbols 54 are known in step 120, the attitude or orientation of the whole of the two-dimensional code 52 relative to the CCD camera 4 (i.e., the scanning line) can be found based on the positions of the orientation symbols 54 derived in step 100 and the positional relations among them.

After step 120, the routine proceeds to step 130 wherein the shape of each of the orientation symbols 54 is estimated, as shown in FIG. 9, based on the lengths of the lines j1 and j2 and inclinations $\alpha$ and $\beta$ relative to the horizontal scanning line L to determine a position Cs0 of a cell at an upper left corner of each of the orientation symbols 54.

The routine then proceeds to step 140 wherein positions of other corner cells Cs1, Cs2, and Cs3 of each of the orientation symbols 54 and the origin cell Cst are mathematically determined based on the lengths of the line j1 and j2 and the inclinations $\alpha$ and $\beta$ relative to the horizontal scanning line L. The positional determination of the origin cell Cst may alternatively be made by finding an intersection of a prolongation of the lower side of the orientation symbol 54 located on the lower left side of the two-dimensional code 52 extending over intermittently arranged black cells Bk1 to Bk5 and a prolongation of the right side of the orientation symbol 54 located on the upper right side of the two-dimensional code extending over intermittently arranged black cells Bk11 to Bk14. It is also preferable that a cell having three of eight directions therearound (i.e., four directions at the angles of $\alpha$ and $\beta$ to the scanning line L1 plus four directions each being intermediate between adjacent two of the four directions at the angles of $\alpha$ and $\beta$ to the scanning line L1) opposite three directions in which the three orientation symbols 54 are present be determined as the origin cell Cst.

Figure 12:
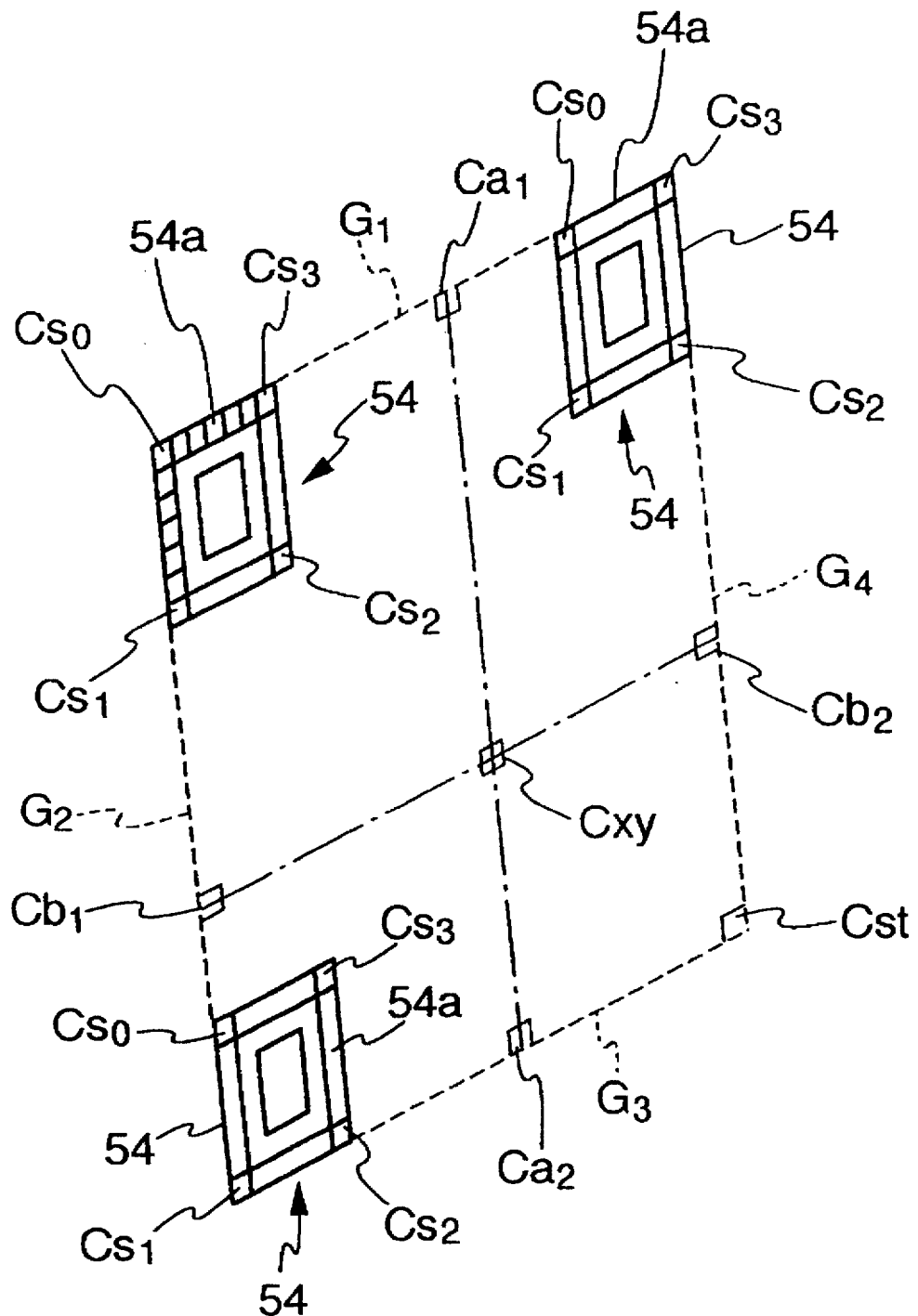
FIG. 12 is an explanatory view which shows a process for determining positions of data cells in a data field.

After the positions of the cells at four corners of each of the orientation symbols 54 and the position of the origin cell Cst are determined in step 140, the routine proceeds to step 150 wherein positions of cells arranged on the four sides G1, G2, G3, and G4 of the two-dimensional code 52 inside the margin 53a, as shown in FIG. 12, are determined, respectively. If the number of cells arranged on each of the sides G1 to G4 is fixed at a given number, the position of each of the cells may be determined by dividing the length of each of the sides G1 to G4 by the number of cells. The length of each of the sides G1 to G4 is easily found because the positions of the cells Cs0, Cs1, Cs2, and Cs3 at the four corners of the two-dimensional code 52 are already known, as described above.

If the number of cells on each of the sides G1 to G4 is not known, the positions of each of the cells may be determined in the following manner. First, the lengths and inclinations of four sides of the hollow square 54a of each of the orientation symbols 54 are determined based on the positions of the corner cells Cs0, Cs1, Cs2, and Cs3. The inclinations of the four sides of the hollow square 54a may be found based on the inclinations $\alpha$ and $\beta$. Next, since the number of cells on each of four sides of the hollow square 54a is already fixed at seven (7), the length of each cell is determined by dividing the length of each of the sides by seven. Finally, the position of each of the cells on the sides G1 to G4 of the two-dimensional code 52 is determined based on the length of each cell.

Subsequently, the routine proceeds to step 160 wherein positions of all data cells in the data field 56 are determined based on the positions of the cells arranged on the four sides G1 to G4. Specifically, the position of an intersection of a line extending between cells Ca1 and Ca2 on the opposite sides G1 and G3 each located away from one end of a corresponding one of the sides G1 and G3 at the same interval and a line extending between cells Cb1 and Cb2 on the other opposite sides G2 and G4 each located away from one end of a corresponding one of the sides G2 and G4 at the same interval, is found as the position of a data cell Cxy.

The routine then proceeds to step 170 wherein the brightnesses or tones of the data cells are determined in a given order to decode code information contained in the data cells. The code information is then stored in a memory for outputting it to another device or displaying it, after which the routine terminates.

In order to determine whether a sequence of signals detected subsequently, showing the above frequency component ratio, is based on the two-dimensional code 52 or another two-dimensional code, that is, whether the two-dimensional code 54 has been displaced by another matrix code in the view of the CCD camera 4 or not, the CPU 24 performs the following operation. If the presence of a sequence of signals showing the above frequency component ratio is detected continuously for a preselected period of time, and then the presence of that sequence of signals is not detected for a subsequent period of time, the CPU 24 determines that the two-dimensional code 52 captured so far by the CCD camera 4 has moved out of the field of view of the CCD camera 4, and that a sequence of signals having the above frequency component ratio, detected subsequently are produced by another two-dimensional code.

With the above operations of the two-dimensional code reading apparatus 2, determination of whether or not the two-dimensional code 52 is on an image captured by the CCD camera 4 can be made by detecting the presence or absence of the frequency component ratio indicative of the presence of the orientation symbols 54 through the frequency component ratio detecting circuit 8 without processing the image using software. The processing by the hardware of the frequency component ratio detecting circuit 8 can, thus, be made at high speeds. The implementation of the above mentioned operations in the CPU 24 after the presence of the two-dimensional code is recognized eliminates the time required for searching the two-dimensional code in the software. Therefore, even when the article W is conveyed at high speed, it is possible to decode the two-dimensional code correctly. In other words, since the two-dimensional code reading apparatus 2 can decode the two-dimensional code at high speed, it is possible to convey the article W at higher speed for improving the article-conveying efficiency without adversely affecting a production line system of the article W.

Moreover, it is possible to find a specific frequency component ratio contained in each of the orientation symbols 54 by scanning the two-dimensional code 52 only in one direction even when the two-dimensional code 52 is oriented in any angular directions. This eliminates the need for searching a given reference pattern by scanning the two-dimensional code 52 many times in different directions. The position of the two-dimensional code 52 are, thus, determined quickly so that the operations of the CPU 24 can be started early.

Further, since the positions of the orientation symbols 54 can be determined by scanning the two-dimensional code 52 only in one direction, even if an image captured by the CCD camera 4 contains a variety of noises other than the two-dimensional code 52, the noises are identified correctly without changing the direction of scanning lines. Subsequently, a code in the data field can be read only by searching around the orientation symbols 54.

Referring to FIG. 13, a two-dimensional code reading apparatus 202 according to the second embodiment is shown which is different from the two-dimensional code reading apparatus 2 of the first embodiment only in that a binary-coding control circuit 204 is provided. Other arrangements are identical, and explanation thereof in detail will be omitted here.

If a portion of the two-dimensional code formed only with dark or light cells is read by the CPU 24, the threshold value used in the binary coding circuit 6 becomes unuseful in coding that portion. For avoiding this problem, the binary-coding control circuit 204 has an address-threshold value correction table for changing the threshold value used in the binary coding circuit 6 according to an address produced by the address generating circuit 12 in response to instructions from the CPU 24.

In operation of the CPU 24, "1" or "0" of each of the data cells is checked, for example, in the detection of the positions of the data cells in step 160 or in the decoding of the data cells in step 170, and an address immediately before an area where signal levels (i.e., "1" or "0") of the data cells are hardly changed is stored along with a correction value of the threshold value. For instance, the CPU 24 changes the threshold value to a higher value for an address immediately before an area where signal levels of "1" (i.e., the light cells) substantially continues, while the threshold value is changed to a lower value for an address immediately before an area where signal levels of "0" (i.e., the dark cells) substantially continues.

If an area formed with substantially consecutive light or dark cells is still detected after changing the threshold value, the threshold value may further be changed stepwise depending on the need.

With the above arrangements of the two-dimensional code reading apparatus 202, even if the two-dimensional code contains portions which will be binary-coded correctly and incorrectly according to the degree of brightness thereof depending upon a type of light source or a place where the apparatus 202 is mounted, substantially the whole area of the two-dimensional code is binary-coded perfectly by correcting the threshold value used in the binary coding circuit 6, so that the CPU 24 can read a tone pattern of the data cells precisely.

While in the above embodiments, each of the orientation symbols 54 is formed with double squares to show a signal pattern, whose frequency component ratio of dark:light:dark:light:dark=1:1:3:1:1, captured along a scanning line passing through the center thereof, it may have a geometrical pattern defined by similar figures arranged coaxially such as circles, as shown in FIG. 14(a) or hexagons, as shown in FIG. 14(b). Additionally, a geometrical pattern, as shown in FIG. 14(c), defined by more than two similar figures arranged coaxially, exhibiting the same frequency component ratio in every direction may be used. Further, an external form of the two-dimensional code may be rectangular.

In the above embodiments, the three orientation symbols 54 are provided, however; four or more orientation symbols may be provided at any locations in the two-dimensional code. Alternatively, two orientation symbols may be provided. In this case, it is impossible to determine the orientation of the two-dimensional code using the positions of the two orientation symbols, however; the position of the data field 56 relative to the orientation symbols may be determined by finding the orientation of the margin 53a around the orientation symbols.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A two-dimensional code reading apparatus comprising:
a CCD sensor that captures an image including a two-dimensional code by optically scanning the image along scanning lines, the two-dimensional code being a rectangular matrix of cells, the two-dimensional code including a data field and three orientation symbols, the orientation symbols having the same pattern, located at three corners of the matrix, respectively, the data field and the orientation symbols each consisting of a given number of the cells, respectively, the CCD sensor outputting scanning line signals having signal levels corresponding to the brightness of portions of the captured image on the scanning lines;
a single binary-coding circuit that codes the scanning line signals outputted from the CCD sensor into binary-coded scanning line signals according to the signal levels of the scanning line signals, and outputs the binary-coded scanning line signals;
a frequency component ratio detecting circuit that compares a frequency component ratio indicated by portions of the binary-coded scanning line signals outputted from the binary-coding circuit with a single reference frequency component ratio corresponding to the pattern of the orientation symbols so as to detect portions of the binary-coded scanning line signals showing the reference frequency component ratio and to provide orientation symbol signals indicative thereof;
memory means for storing the binary-coded scanning line signals as image data at memory locations indicated by addresses each corresponding to coordinates on the image captured by said CCD sensor;
an address latching circuit that determines coordinates on the captured image to which the orientation symbol signals provided by the frequency component ratio detecting circuit correspond according to a timing of signals output by the frequency component ratio detecting circuit, and writes the determined coordinates in the image data stored in the memory means; and
a CPU that reads the image data, in which the coordinates of the orientation symbol signals are written by the address latching circuit, from the memory means to determine positions of the orientation symbols in the captured image based on the coordinates of the orientation symbol signals, and reads data represented by the two-dimensional code based on the positions of the orientation symbols.

2. A two-dimensional code reading apparatus as set forth in claim 1, wherein the two-dimensional code further includes a margin, which is defined as portions of the two-dimensional code adjacent to the orientation symbols, and wherein the frequency component ratio detecting circuit further detects portions of the binary-coded scanning line signals indicating the margin as a margin signal for distinguishing the orientation symbols from the data field.

3. A two-dimensional code reading apparatus as set forth in claim 1, further comprising binary-coding threshold value correcting means for correcting a threshold value used in said binary coding circuit for coding the scanning line signals from said CCD sensor into the binary-coded scanning line signals according to conditions of the binary-coded scanning line signals.

4. A two-dimensional code reading apparatus as set forth in claim 3, wherein the conditions of the binary-coded scanning line signals are signal levels of the binary-coded scanning line signals.

5. A two-dimensional code reading apparatus as set forth in claim 1, further comprising operation prohibiting means for prohibiting a two-dimensional code reading operation of the two-dimensional code reading apparatus when the frequency component ratio detecting circuit provides no orientation symbol signal.

6. A two-dimensional code reading apparatus as set forth in claim 1, further comprising two-dimensional code change detecting means for detecting when the two-dimensional code is displaced out of a field of view of the CCD sensor when the frequency component ratio detecting circuit does not detect any portion of the binary-coded scanning line signals showing the same frequency component ratio as the reference frequency component ratio for a second predetermined period of time after the frequency component ratio detecting circuit continuously provides the orientation symbol signals for a first predetermined period of time.

7. A two-dimensional code reading apparatus as set forth in claim 6, wherein when the frequency component ratio detecting circuit detects another sequence of binary-coded scanning line signals showing the same frequency component ratio as the reference frequency component ratio after the second predetermined period of time has elapsed, the two-dimensional code change detecting means determines that another two-dimensional code is being scanned by the CCD sensor.

8. A two-dimensional code reading apparatus as set forth in claim 1, wherein the frequency component ratio detecting circuit includes:
counter means for detecting rising edges and falling edges of the binary-coded scanning line signals outputted from the binary coding circuit to measure lengths between the adjacent edges, and outputting count values indicative of the measured lengths in sequence,
a plurality of latching circuits that latch the count values outputted from the counter means in sequence, and
comparator means for comparing the count values latched in the latching circuits to determine that the sequence of the binary-coded scanning line signals showing the reference frequency component ratio has been detected when a given sequence of the count values are arranged at a given ratio corresponding to the reference frequency component ratio.

9. A two-dimensional code reading apparatus as set forth in claim 1, wherein each of the orientation symbols of the two-dimensional code includes similar figures arranged coaxially so as to define a pattern having the sequence of the binary-coded scanning line signals detected by the frequency component ratio detecting circuit, and that exhibit the same frequency component ratio even when the CCD sensor scans each of the orientation symbols along scanning lines extending in different directions.

10. A two-dimensional code reading apparatus as set forth in claim 2, wherein each of the orientation symbols is rectangular in shape, the margin being arranged outside the orientation symbols in the matrix of the two-dimensional code, and wherein when the frequency component ratio detecting circuit detects the portions of the binary-coded scanning line signals indicating the margin immediately prior to or following detection of each of the portions of the binary-coded scanning line signals showing the reference frequency component ratio, the CPU determines the positions of the orientation symbols in the captured image based on the coordinates of the orientation symbol signals.

11. A two-dimensional code reading apparatus as set forth in claim 2, wherein the frequency component ratio detecting circuit determines a positional relation between the margin and each of the orientation symbols based on the margin signal and the orientation symbol signals so as to specify a position of each of the orientation symbols in the matrix of the two-dimensional code.

12. A two-dimensional code reading apparatus as set forth in claim 11, wherein the frequency component ratio detecting circuit determines which side of each of the orientation symbols on one of the scanning lines the margin lies on and writes positional data indicative thereof in the image data, and wherein the CPU refers to the positional data to determine the position of each of the orientation symbols in the matrix of the two-dimensional code.

13. A two-dimensional code reading apparatus as set forth in claim 1, wherein the CPU determines the number of the orientation symbols based on the orientation symbols signals detected by the frequency component ratio detecting circuit and terminates an operation of reading the data represented by the two-dimensional code when the number of the orientation symbols is less than three.

14. A two-dimensional code reading apparatus as set forth in claim 13, Wherein when the number of the orientation symbols is more than three, the CPU logically scans the image data stored in the memory means in a direction different from the scanning lines to determine positions of the orientation symbols in the matrix of the two-dimensional code.

15. A two-dimensional code reading apparatus as set forth in claim 14, wherein the CPU logically scans the image data stored in the memory means in the direction different from the scanning lines to determine other portions of the binary-coded scanning line signals showing the reference frequency component ratio than those corresponding to the orientation symbol signals.

16. A two-dimensional code reading apparatus as set forth in claim 1, wherein the CPU logically defines three lines each extending between adjacent two of the three orientation symbols in the matrix of the two-dimensional code to derive angles between adjacent two of the three lines and determines a positional relation among the three orientation symbols in the matrix of the two-dimensional code based on the angles.

17. A two-dimensional code reading apparatus as set forth in claim 16, wherein the CPU selects one out of the three angles which shows about 90° and which is formed by two of the three lines equal in length to each other and specifies the positional relation among the three orientation symbols based on the selected one of the three angles for determining the position of each of the orientation symbols in the matrix of the two-dimensional code.

18. A two-dimensional code reading apparatus as set forth in claim 17, wherein the CPU determines that one of the three orientation symbols from which extend the two of the three lines equal in length to each other lies at the center of the three adjacent corners of the matrix of the two-dimensional code.

19. A two-dimensional code reading apparatus as set forth in claim 1, wherein each of the cells have a brightness corresponding to information represented thereby.

20. A two-dimensional code reading apparatus as set forth in claim 19, wherein the single binary-coding circuit codes scanning line signals outputted from the CCD sensor when the CCD sensor is scanning cells from the data field and when the CCD sensor is scanning the orientation symbols, the binary-coded scanning line signals having values corresponding to the information represented by the brightness of the cells in the two-dimensional code matrix.

* * * * *